(12) United States Patent
Chan et al.

(10) Patent No.: US 9,537,681 B1
(45) Date of Patent: Jan. 3, 2017

(54) MULTIMODE EQUALIZATION CIRCUITRY

(71) Applicant: Altera Corporation, San Jose, CA (US)

(72) Inventors: Allen K. Chan, San Jose, CA (US); Vishal Giridharan, San Jose, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/536,417

(22) Filed: Nov. 7, 2014

Related U.S. Application Data

(60) Provisional application No. 61/973,211, filed on Mar. 31, 2014.

(51) Int. Cl.
*H04L 25/03* (2006.01)

(52) U.S. Cl.
CPC ... *H04L 25/03057* (2013.01); *H04L 25/03878* (2013.01); *H04L 25/03885* (2013.01); *H04L 2025/03439* (2013.01)

(58) Field of Classification Search
CPC ............ H04B 3/14; H04L 25/03885; H04L 25/03878; H04L 25/085; H04L 25/03057; H04L 2025/03439
See application file for complete search history.

(56) References Cited

U.S. PATENT DOCUMENTS

| | | | | |
|---|---|---|---|---|
| 4,095,126 A | * | 6/1978 | Hoffman | H03G 11/00 327/309 |
| 4,217,506 A | * | 8/1980 | Sawyer et al. | 327/78 |
| 4,555,788 A | * | 11/1985 | Merrill | 375/232 |
| 4,578,638 A | * | 3/1986 | Takano et al. | 324/76.23 |
| 4,665,531 A | * | 5/1987 | Aly | 375/286 |
| 5,048,055 A | * | 9/1991 | Creigh | H04L 25/03878 333/18 |
| 5,132,926 A | * | 7/1992 | MacEachern | H04L 25/03019 375/232 |
| 5,670,916 A | * | 9/1997 | Korn | 333/18 |
| 5,692,013 A | | 11/1997 | Koslov et al. | |
| 7,391,229 B1 | * | 6/2008 | Santurkar et al. | 326/30 |
| 7,688,106 B1 | | 3/2010 | Shumarayev et al. | |
| 7,952,376 B1 | | 5/2011 | Yu Kasnavi et al. | |
| 8,270,463 B1 | * | 9/2012 | Rane et al. | 375/232 |
| 8,396,110 B1 | * | 3/2013 | Hsieh | H04L 25/03038 375/229 |
| 8,744,012 B1 | | 6/2014 | Ding et al. | |
| 9,325,489 B2 | * | 4/2016 | Hsieh | H04L 7/0025 |
| 2002/0130719 A1 | * | 9/2002 | Aoki | 330/284 |

(Continued)

OTHER PUBLICATIONS

Maxim 3800 "3.2Gbps Adaptive Equalizer and Cable Driver", Dec. 2005, pp. 1-13.*

*Primary Examiner* — Sophia Vlahos

(57) ABSTRACT

An integrated circuit may include receiver circuitry that receives data from an external device. Such receiver circuitry may include, among other things, equalization circuitry that may reconstruct the received data before transmitting the received data to other parts of the integrated circuit. The receiver circuitry may include two different equalization circuits. A first equalization circuit may perform equalization on the received data to generate a first equalized output while a second equalization circuit may generate a second equalized output. The receiver circuitry may further include an amplifier circuit that selectively amplifies either the first or second equalized output from the respective first and second equalization circuits based on the data rate of the received data.

16 Claims, 5 Drawing Sheets

(56) References Cited

U.S. PATENT DOCUMENTS

| | | | |
|---|---|---|---|
| 2004/0022303 A1* | 2/2004 | Tonietto et al. | 375/219 |
| 2004/0081146 A1* | 4/2004 | Tang | H04Q 3/52 370/370 |
| 2006/0280240 A1* | 12/2006 | Kikugawa | G11B 20/10009 375/229 |
| 2012/0121004 A1* | 5/2012 | Chang | H03H 7/40 375/232 |
| 2012/0201289 A1 | 8/2012 | Abdalla et al. | |
| 2012/0314750 A1* | 12/2012 | Mehrabani | H04L 27/01 375/229 |
| 2013/0028299 A1 | 1/2013 | Tsai | |
| 2013/0142244 A1* | 6/2013 | Tan | H04L 25/03012 375/232 |
| 2013/0169314 A1* | 7/2013 | Choudhary et al. | 327/91 |
| 2014/0056346 A1 | 2/2014 | Qian et al. | |
| 2014/0098852 A1* | 4/2014 | Xiong | H04N 19/426 375/240.02 |

* cited by examiner

MULTIMODE EQUALIZATION CIRCUITRY

This application claims the benefit of provisional patent application No. 61/973,211, filed Mar. 31, 2014 which is hereby incorporated by reference herein in its entirety.

BACKGROUND

In a typical serializer/deserializer (SerDes) system, a transmitter circuit is coupled to a receiver circuit. A serial data stream is transmitted from the transmitter circuit via transmission lines, which may be referred to collectively as a transmission channel, that connect the transmitter circuit to the receiver circuit.

As an example, an integrated circuit such as a field programmable gate array (FPGA) device or an application specific integrated circuit (ASIC) device, may include transceiver circuitry that includes both transmitter and receiver circuits. Signals may be transmitted from logic blocks within the integrated circuit device (e.g., the core region of the device) to the transmitter circuit to be transmitted out of the integrated circuit device. Accordingly, signals received by the receiver circuit may be transmitted to the core region or other parts of the integrated circuit device for further processing.

When signals are propagated from one circuit to another (e.g., from a transmitter circuit to a receiver circuit, or from one integrated circuit device to another), there may be signal loss due to numerous reasons (e.g., resistance in the transmission channel, etc.). As such, the received signals are distorted and may need to be reconstructed (or equalized) before they are processed or used by other circuitry.

Generally, an equalizer is included in transmitter and receiver circuits to equalize signals that are being transmitted between different circuits or devices. However, the equalizer circuit typically only supports a limited range of data rates and as such may only be applicable to limited applications that fall within that range. It is within this context that the embodiments described herein arise.

SUMMARY

Circuitry and techniques for implementing multimode equalization circuitry (e.g., an equalization circuit that can operate in a first mode supporting a first date rate and in a second mode supporting a second date rate that is different than the first data rate) on an integrated circuit (IC) are provided.

In some embodiments, the equalization circuitry may be able to support a wide range of data rates (ranging from 12 gigabits per second (Gbps) in one mode to 28 Gbps in another mode). It is appreciated that the present invention can be implemented in numerous ways, such as a process, an apparatus, a system, or a device. Several inventive embodiments of the present invention are described below.

Receiver circuitry that receives data from an external device may include two equalization circuits and an amplifier circuit. A first equalization circuit may perform equalization on the received data to generate a corresponding first equalized output. A second equalization circuit may perform equalization on the received data to generate a corresponding second equalized output. The two equalized outputs may be transmitted to the amplifier circuit. The amplifier circuit may selectively output the first equalized output when the received data is at a first data rate and may selectively output the second equalized output when the received data is at a second data rate. As an example, the first data rate may be below 12 gigabits per second (Gbps) while the second data rate may be 28 Gbps or more.

As mentioned above, an IC may be connected to other circuitry and as such, may transmit data to or receive data from circuitry connected to the IC. An IC that receives a data stream may include equalization circuitry that equalizes the received data stream to produce two equalized outputs. The IC may further include amplifying circuitry that receives the two equalized outputs from the equalization circuitry may amplify one of the two equalized outputs. In one embodiment, the amplifying circuitry may include a multiplexing circuit that selectively transmits one of the two equalized outputs for amplification depending on the data rate of the received data stream.

A method of operating an IC such (e.g., a field programmable gate array (FPGA) device) that is connected to an off-chip device may include receiving data from the off-chip device and selectively enabling different equalization paths based on the data rate of the received data. As an example, the IC may include two equalization circuits, each producing an equalized output, that are coupled to multiplexing circuitry in the IC. The multiplexing circuitry may accordingly selectively enable or transmit one of the two equalized outputs as the equalized output for the received data based on the data rate of the received data. In some instances, the multiplexing circuitry may be embedded in amplification circuitry that amplifies the two equalized outputs from the two equalization circuits before the selected equalized output is transmitted to other parts of the IC.

DETAILED DESCRIPTION

The embodiments provided herein include circuitry and techniques to implement a multimode or multi-rate equalization circuit in an integrated circuit (IC). In some embodiments, the equalization circuit may be able to support a wide range of data rates (ranging from 12 gigabits per second (Gbps) and below up to 28 Gbps).

It will be obvious to one skilled in the art that the present exemplary embodiments may be practiced without some or all of these specific details. In other instances, well-known operations have not been described in detail in order not to unnecessarily obscure the present embodiments.

Figure 1:
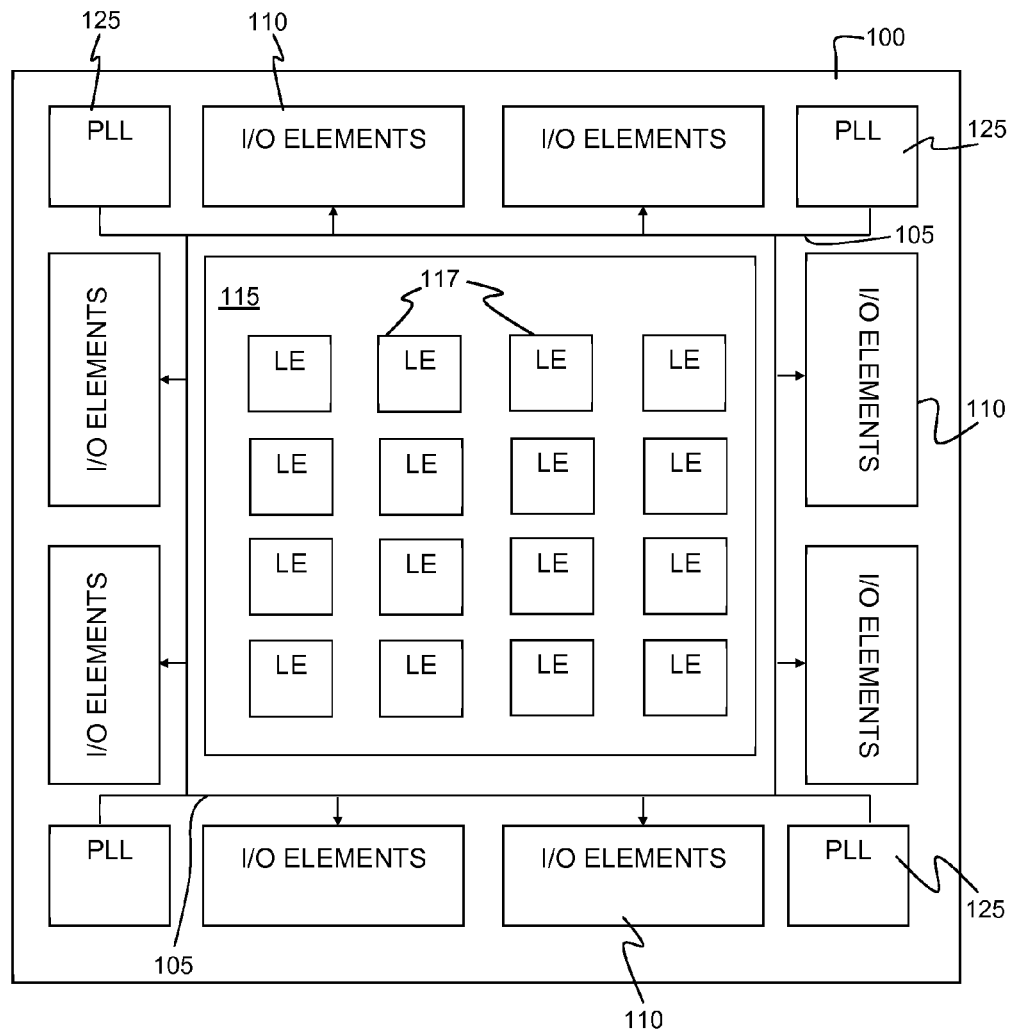
FIG. 1 is a block diagram of an illustrative integrated circuit in accordance with embodiments of the present invention.

An IC device, such as a field-programmable gate array (FPGA) device or an application specific integrated circuit (ASIC) device, generally includes high-speed input-output circuitry, including, among others, transceiver circuitry. FIG. 1, meant to be illustrative and not limiting, shows a block diagram of IC 100 that can implement embodiments of the present invention. Generally, an IC device such as IC 100 includes core logic region 115 and input-output elements 110.

Integrated circuit (IC) devices generally use a clock signal to synchronize different circuit elements in the device. Phase-locked loops (PLLs) 125 for clock generation and timing, may be located outside the core logic region 115 (e.g., at corners of IC 100 and adjacent to input-output elements 110 as shown in FIG. 1). In the embodiment of FIG. 1, IC 100 may include clock network 105. It should be appreciated that clock network 105 may be used to transmit clock signals from clock circuits (e.g., PLLs 125) to core logic region 115 and various parts of IC 100.

Core logic region 115 may be populated with logic cells that include "logic elements" (LEs) 117, among other circuits. LEs 117 may include look-up table-based logic regions and may be grouped into "Logic Array Blocks" (LABs). LEs 117 and groups of LEs or LABs can be configured to perform logical functions desired by the user. Configuration data loaded into configuration memory may be used to produce control signals that configure LEs 117 and groups of LEs and LABs to perform the desired logical functions.

Signals received from external circuitry at input-output elements 110 may be routed from input-output elements 110 to core logic region 115 and other logic blocks on IC 100. Core logic region 115 and other logic blocks on IC 100 may accordingly perform functions based on the signals received. Signals may be sent from core logic region 115 and other relevant logic blocks of IC 100 to other external circuitry or components that may be connected to IC 100 through input-output elements 110. A single device like IC 100 can potentially support a variety of different interfaces and each individual input-output bank 110 may support a different input-output standard with a different interface or protocol (e.g., high-speed serial interface protocol).

In the embodiment of FIG. 1, input-output elements 110 may include input-output buffers and high-speed transceiver circuitry that connect IC 100 to other external components. Generally, transceiver circuitry may include transmitter and receiver circuits that communicate with external components via different interfaces. In one scenario, transceiver circuitry (not shown) in IC 100 may receive and transmit data streams at different data rates. As an example, the transceiver circuitry may be coupled to equalization circuits that perform equalization on the data stream being transmitted or the received data stream. As an example, a continuous time linear equalizer (CTLE) circuit that equalizes and/or amplifies a received data stream may be coupled to a receiver circuit in the transceiver circuitry.

Figure 2:
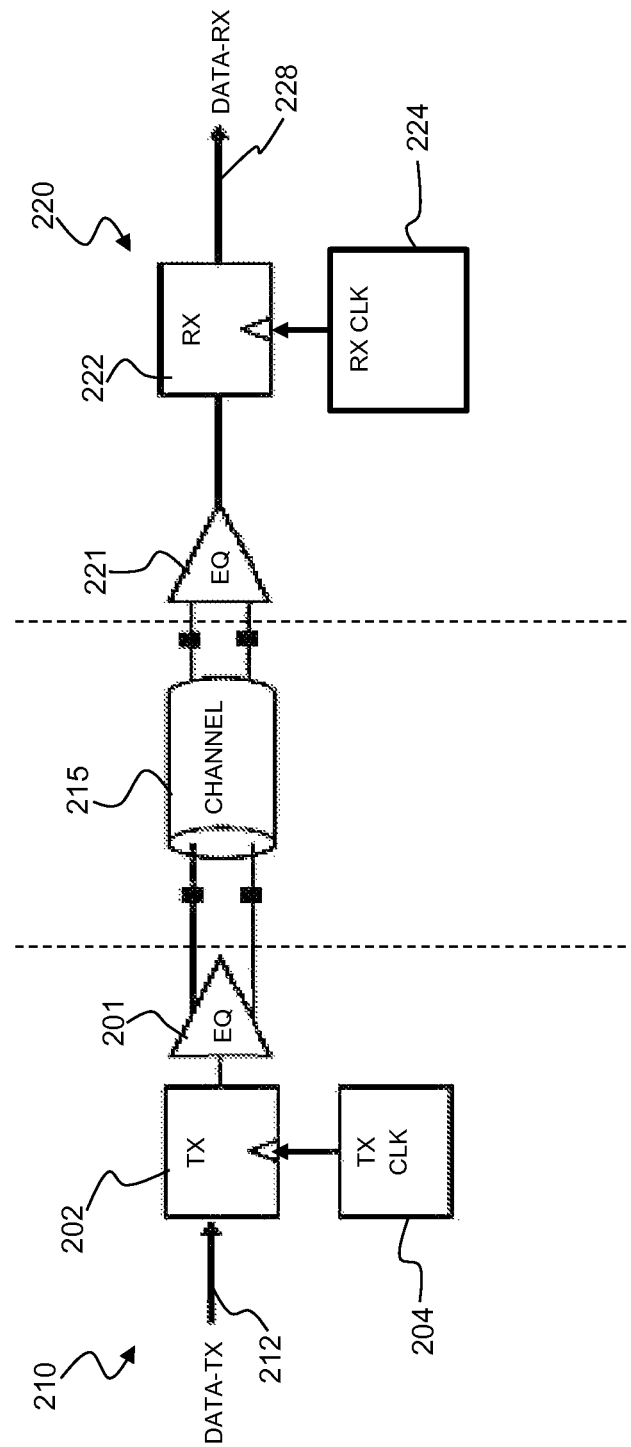
FIG. 2 shows an illustrative transmitter circuit in an integrated circuit device coupled to a receiver circuit in another integrated circuit device in accordance with embodiments of the present invention.

FIG. 2 shows an illustrative transmitter circuit in IC device 220 coupled to a receiver circuit in IC device 210 in accordance with embodiments of the present invention. In FIG. 2, transmitter circuit 202 is coupled to a clock source 204 and an equalization circuit 201. Clock source 204 may include a PLL circuit (not shown) that supplies clock signals to transmitter circuit 202. A data stream DATA-TX may be transmitted from other regions (e.g., core region 115 of FIG. 1) or circuits on IC device 210 to transmitter circuit 202 via input terminal 212.

Transmitter circuit 202 may serialize the data stream DATA-TX before transmitting the serialized data stream to equalization circuit 201. As an example, equalization circuit 201 may be a finite impulse response (FIR) filter that is coupled to a serializer circuit (not shown) within transmitter circuit 202. Specific details of the FIR filter are not shown and discussed herein in order to not unnecessarily obscure the present invention.

The equalized data stream from IC device 210 may then be transmitted to IC device 220 via transmission channel 215. It should be noted that IC device 220 may be any external component or an off-chip element that is coupled to IC 210 to receive data stream DATA-TX transmitted from integrated circuit device 210. Transmission channel 215 may be any suitable channel interface that is used to transmit such data streams (e.g., a cable, wiring, traces on a printed circuit board, antenna, etc.). As such, channel 215 may include multiple input and output pins. In one scenario, the data stream transmitted via channel 215 may be a differential data stream and channel 215 may include differential input-output pin pairs.

As shown in the embodiment of FIG. 2, the data stream from IC device 210 is received at equalization circuit 221 prior to being transmitted to receiver circuit 222. Receiver clock source 224 may be coupled to receiver circuit 222. It should be noted that receiver clock source 224 may include a clock and data recovery (CDR) circuit (not shown) that supplies a recovered clock signal to receiver circuit 222. As is generally known, the recovered clock signal may be based at least in part on the data rate or frequency of the received data stream.

In one embodiment, the received data stream may first be processed by equalization circuitry 221 before being processed by receiver circuit 222 and transmitted to other parts of IC device 220 as output DATA-RX via output terminal 228. As an example, equalization circuitry 221 may include a continuous time linear equalization (CTLE) circuit. In one scenario, the CTLE circuit may be adapted to support a wide range of data rates (e.g., 1 Gbps-28 Gbps). In this scenario, equalization circuitry 221 may include two (or more) CTLE circuits that are adapted to process the received data stream. Different equalization circuits or different output paths from the multiple equalization circuits may be enabled based on the data rate of the received data stream.

Figure 3:
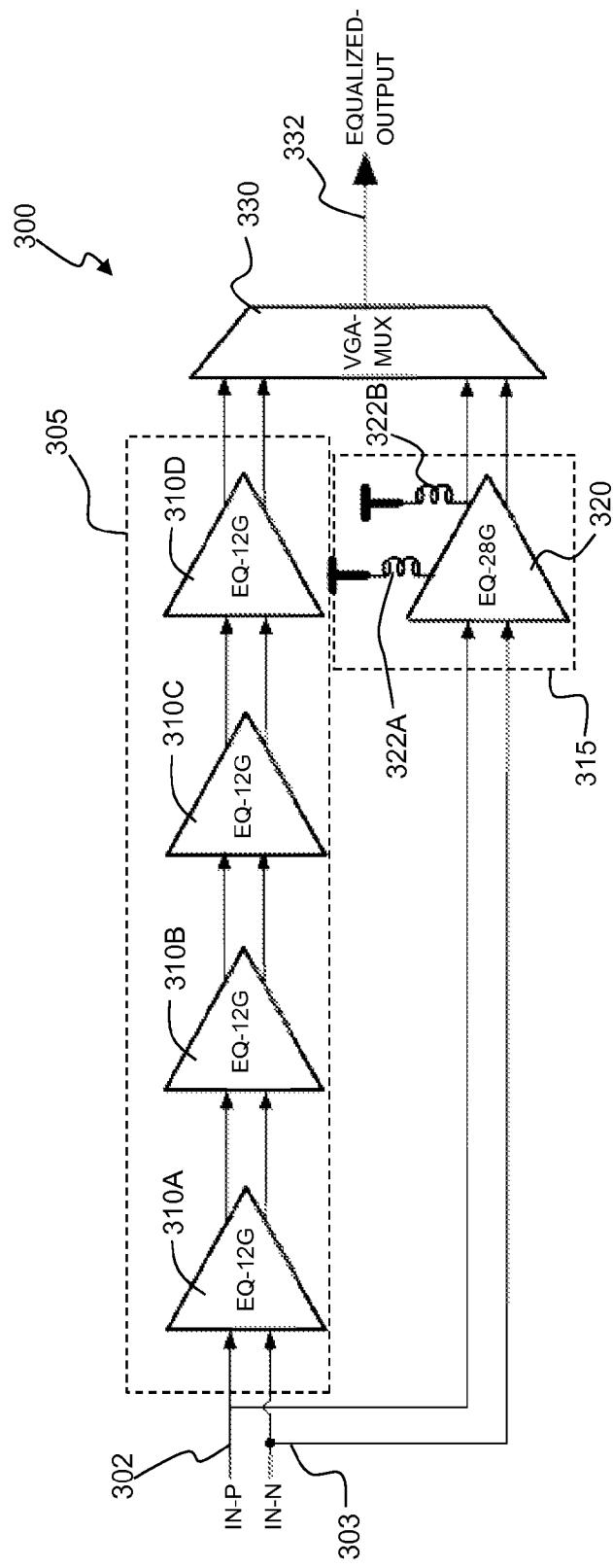
FIG. 3 shows illustrative equalization circuitry in accordance with embodiments of the present invention.

FIG. 3 shows illustrative equalization circuitry 300 in accordance with embodiments of the present invention. In the embodiment of FIG. 3, equalization circuitry 300 may be adapted to receive differential input data streams. As such, circuitry 300 may receive a pair of complementary data signals IN-P and IN-N at input terminals 302 and 303 respectively. Equalization circuitry 300 includes four-stage equalization circuit 305 and single-stage equalization circuit 315. Four-stage equalization circuit 305 includes equalizer circuits 310A-310D while single-stage equalization circuit 315 includes a single equalizer circuit 320 with a pair of inductors 322A and 322B coupled to the equalizer circuit 320.

In one scenario, equalization circuitry 300 may be CTLE circuitry that is coupled to a receiver circuit, similar to equalization circuitry 221 as described above with reference to FIG. 2. In this scenario, four-stage equalization circuit 305 (or a multi-stage equalization circuit) and single-stage equalization circuit 315 may thus be active CTLE circuits (the details of which are not described herein in order not to unnecessarily obscure the present invention) that are adapted to equalize data streams at different data rates. For example, four-stage equalization circuit 305 may be used to equalize data streams with data rates below 28 Gbps (or even below 12 Gbps). Accordingly, single-stage equalization circuit 315 may be used to equalize data streams with data rates of 28 Gbps and above.

As shown in FIG. 3, the outputs of the respective equalization circuits 305 and 315 are coupled to variable gain amplifier with an embedded multiplexing circuit, VGA-MUX 330. In one scenario, the multiplexing circuit in VGA-MUX 330 may be adapted to select one of the two input pair paths coupled to VGA-MUX 330 (i.e., either the first path from four-stage equalization circuit 305 or the second path from single-stage equalization circuit 315) based on the data rate of the received data stream. For example, when the data rate of the received data stream is 28 Gbps or higher, VGA-MUX 330 (or more specifically, the multiplexing circuit within VGA-MUX 330) may selectively transmit the output from single-stage equalization circuit 315 to the variable gain amplifier within VGA-MUX 330.

The selected output may accordingly be amplified before being transmitted out of VGA-MUX 330 as EQUALIZED-OUTPUT via output terminal 332. In some scenarios, the output terminal 332 of VGA-MUX 330 may be coupled to another equalization circuit (not shown), such as a decision feedback equalization (DFE) circuit, that may then perform further equalization on EQUALIZED-OUPUT transmitted from VGA-MUX 330.

Figure 4:
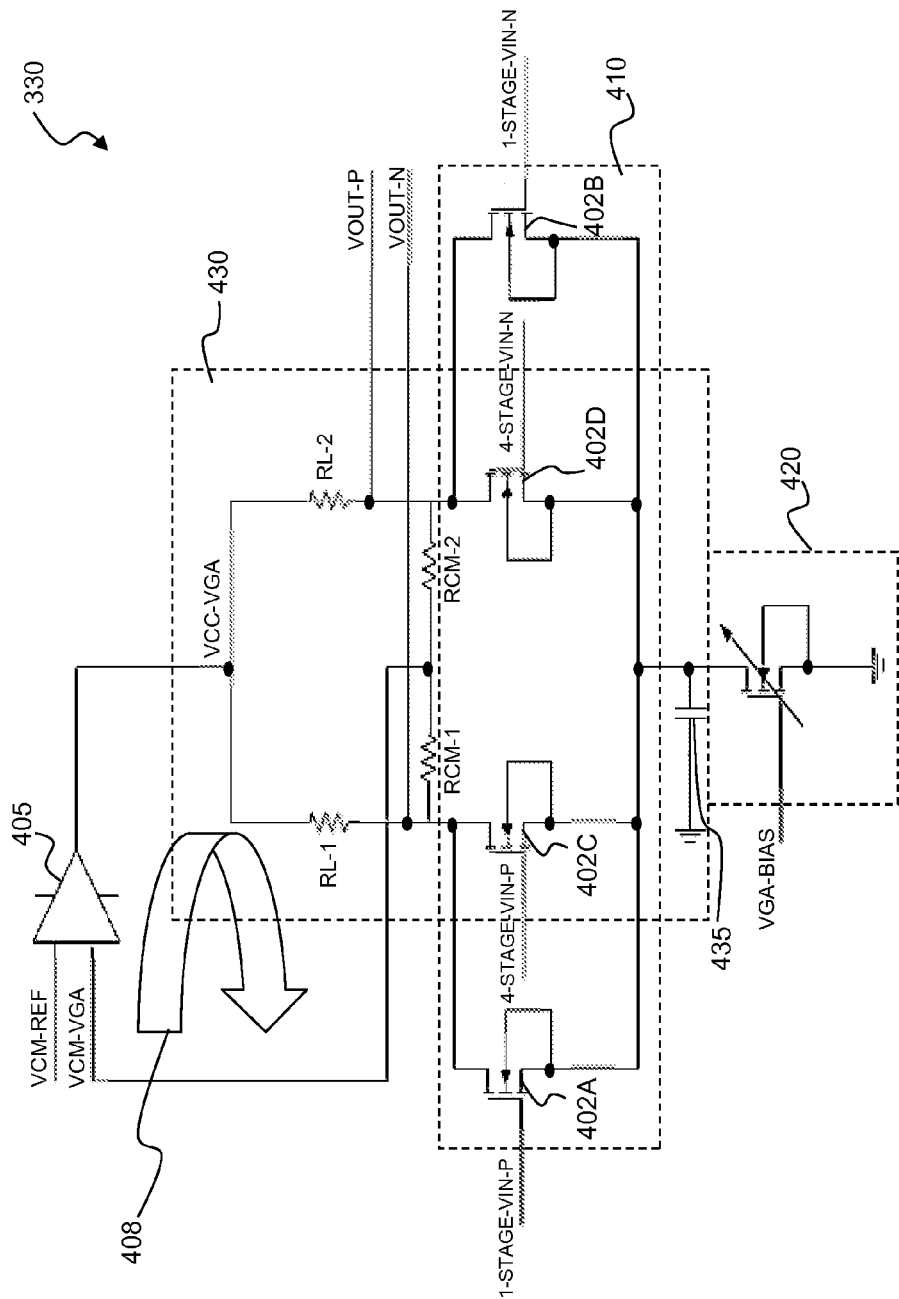
FIG. 4 shows a detailed circuit diagram of illustrative amplifier circuitry with a multiplexing circuit in accordance with embodiments of the present invention.

FIG. 4 shows a detailed circuit diagram of illustrative VGA-MUX 330 in accordance with embodiments of the present invention. As shown in FIG. 4, VGA-MUX 330 includes multiplexing circuit 410 and biasing circuit 420 coupled to amplifier circuit 430. Amplifier circuit 430 may include resistors RL-1, RL-2, RCM-1 and RCM-2, and capacitor 435, and may produce differential outputs VOUT-P and VOUT-N. The differential output pair VOUT-P and VOUT-N may be referred to collectively as EQUALIZED-OUTPUT in FIG. 3.

Referring still to FIG. 4, multiplexing circuit 410 that is coupled to amplifier circuit 430 includes transistors 402A, 402B, 402C and 402D. In one scenario, multiplexing circuit 410 may receive two pairs of differential inputs. As an example, VGA-MUX 330 receives a pair of differential inputs from equalization circuit 305 and another pair of differential inputs from equalization circuit 315 of FIG. 3. As shown in FIG. 4, the two pairs of differential inputs are shown as 1-STAGE-VIN-P and 1-STAGE-VIN-N, and 4-STAGE-VIN-P and 4-STAGE-VIN-N, respectively.

In the embodiment of FIG. 4, the two pairs of differential inputs 1-STAGE-VIN-P and 1-STAGE-VIN-N, and 4-STAGE-VIN-P and 4-STAGE-VIN-N are transmitted respectively to transistors 402A, 402B, 402C and 402D in multiplexing circuit 410. As explained above, depending on the data rate of the data stream received, multiplexing circuit 410 may selectively transmit one of the two pairs of differential inputs for amplification. For example, either the pair of transistors 402A and 402B may be enabled or the pair of transistors 402C and 402B may be turned on at any one time and amplifier circuit 430 may amplify the selected input pair accordingly. It should be noted that actual operations of amplifier circuit 430 and related circuit elements such as resistors RL-1, RL-2, RCM-1 and RCM-2, and capacitor 435 are not described in detail herein in order to not unnecessarily obscure the present invention.

In one scenario, VGA-MUX 330 may be part of an integrated circuit device (e.g., IC device 100 shown in FIG. 1) and as such, multiplexing circuit 410 may transmit the selected pair of differential inputs based on settings in the configuration memory (CRAM) bits of the IC device. In this scenario, the non-selected differential input pair signals (e.g., either 1-STAGE-VIN-P and 1-STAGE-VIN-N, or 4-STAGE-VIN-P and 4-STAGE-VIN-N) may be driven to a ground voltage, thus disabling that input pair.

Generally, an amplifier circuit (or more specifically, a variable gain amplifier (VGA) circuit) may include a source degeneration resistor (or an adjustable resistor) and a capacitor (e.g., capacitor 435). In such a circuit, the gain of the amplifier may be controlled by varying its source resistance (e.g., by adjusting the source degeneration resistor). There may be parasitic capacitance at the source node of the capacitor due to, among others, the source resistance, current source, and input switches in the amplifier. As such, having additional inputs in order to implement a multiplexing circuit such as multiplexing circuit 410 (that is incorporated as part of the amplifier circuit) may further increase the parasitic capacitance of the circuit, thereby potentially reducing the bandwidth of the circuit at higher frequencies.

In the embodiment of FIG. 4, biasing circuit 420 may be used in place of a source degeneration resistor. An end of capacitor 435 is coupled to a ground voltage GND while another end (e.g., a source node) is coupled to biasing circuit 420. Biasing circuit 420 receives a source current VGA-BIAS that is adapted to adjust the gain of amplifier circuit 430. As an example, the source current VGA-BIAS may be adjusted by controlling current mirror circuits (details of which are not shown in order to not unnecessarily obscure the present invention) that may be coupled to VGA-MUX 330.

As mentioned above, having a source degeneration resistor may increase the parasitic capacitance at the source node of capacitor 435. In one scenario, using biasing circuit 420 instead of a source degeneration resistor may eliminate the parasitic capacitance from the source degeneration resistor, thereby reducing the overall parasitic capacitance at the source node of capacitor 435. Accordingly, having reduced parasitic capacitance may accommodate the additional inputs needed in order to incorporate multiplexing circuit 410 into VGA-MUX 330 without reducing the bandwidth of the amplifier circuit at higher frequencies.

In the embodiment of FIG. 4, a feedback loop that includes operational amplifier 405 may be formed for amplifier circuit 430. The gain voltage VCM-VGA of amplifier circuit 430 may be transmitted to an input terminal of operational amplifier 405. In FIG. 4, another input of operational amplifier 405 may receive a reference voltage VCM-REF. The reference voltage VCM-REF may be received from any reference source (e.g., by biasing the reference voltage from a resistor with a compensated current source, etc.). It should be noted that changing the bias current VGA-BIAS in biasing circuit 420 may alter the output common mode voltage (i.e., the average voltage between the different output signals VOUT-P and VOUT-N). Therefore, in one scenario, operational amplifier 405, coupled to amplifier circuit 430 in a negative feedback loop 408, may compensate changes in the output common mode voltage. As shown in FIG. 4, voltage VCC-VGA from operational amplifier 405 may compensate the changes in the average voltage difference between output signals VOUT-P and VOUT-N).

Figure 5:
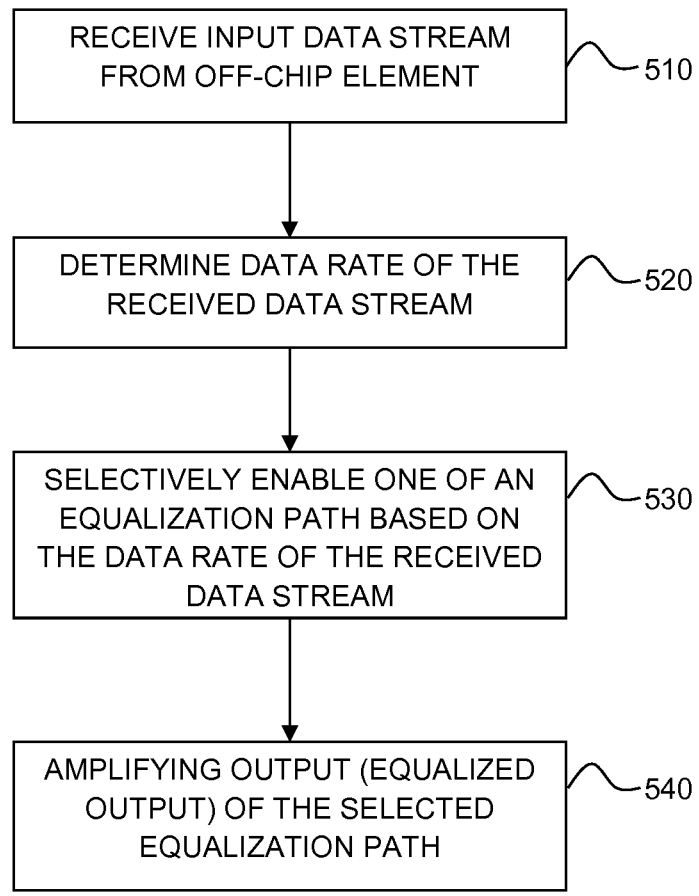
FIG. 5 shows illustrative steps for operating equalization circuitry of the type shown in FIG. 3 in accordance with embodiments of the present invention.

FIG. 5 shows illustrative steps for operating equalization circuitry in accordance with embodiments of the present invention. As an example, the equalization circuit may be a dual-path equalization circuit similar to equalization circuitry 300 shown in FIG. 3. At step 510, an input data stream is received at the IC from an off-chip element. As shown in FIG. 2, an IC may include a receiver circuit such as receiver circuit 222 that may receive data streams or signals from an external element (e.g., another IC). In one embodiment, an equalization circuit may be coupled to the receiver circuit such that the received signals may first be equalized before being processed by the receiver circuit.

At step 520, the data rate of the received data stream is determined. In one scenario, the data rate of the received data stream may be determined based on configuration bits in the IC that are associated with the receiver circuit (e.g., the receiver circuit may have been configured to operate at a specific data rate). At step 530, one of the equalization paths in the dual-path equalization circuit may be selectively enabled based on the data rate of the received data stream.

As shown in FIG. 3, VGA-MUX 330 may selectively transmit either one of the outputs from equalization circuit 305 and equalization circuit 315. As an example, when the data rate of the received data stream is 28 Gbps (or higher), VGA-MUX 330 selects the output pair from equalization circuit 315. Conversely, when the data rate of the received data stream is lower (e.g., 12 Gbps or lower), VGA-MUX 330 selects the output pair from equalization circuit 305.

At step 540, the selected output or equalized output from one of the equalization circuits may be amplified. In the embodiment of FIG. 4, amplifier circuit 430 in VGA-MUX circuitry 330 may amplify the selected differential pair (e.g., either 1-STAGE-VIN-P and 1-STAGE-VIN-N, or 4-STAGE-VIN-P and 4-STAGE-VIN-N) from multiplexing circuit 410. The amplified output pair VOUT-P and VOUT-N may then be transmitted to another equalization circuit (e.g., a DFE circuit) that may be connected to VGA-MUX circuitry 330 (actual details of which are not shown in order to not unnecessarily obscure the present invention).

It is noted that even the embodiments described above have been described with respect to programmable logic circuits, the methods and apparatus described herein may be advantageously incorporated into any suitable integrated circuit. For example, these method and apparatus may also be incorporated into numerous types of devices such as microprocessors or other integrated circuits. Other examples of such integrated circuits include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. Receiver circuitry that receives data from an external device, comprising:
    a first equalization circuit that performs equalization on the received data and that generates a corresponding first equalized output, wherein the first equalization circuit comprises a plurality of equalizer circuit stages;
    a second equalization circuit that performs equalization on the received data and that generates a corresponding a second equalized output, wherein the second equalization circuit is separate from the first equalization circuit, and wherein the second equalization circuit comprises a single-stage equalizer circuit; and
    an amplifier circuit that outputs the first equalized output when the data has a first data rate that is less than a predetermined threshold and that outputs the second equalized output when the data has a second data rate that is greater than the predetermined threshold.

2. The receiver circuitry defined in claim 1, wherein the first and second equalization circuits are continuous time linear equalization (CTLE) circuits.

3. The receiver circuitry defined in claim 1, wherein the amplifier circuit comprises a variable gain amplifying circuit.

4. The receiver circuitry defined in claim 3, wherein the variable gain amplifying circuit comprises:
    a biasing circuit that adjusts a voltage that is supplied to the variable gain amplifying circuit.

5. The receiver circuitry defined in claim 1, wherein the amplifier circuit includes an operational amplifier coupled in a negative feedback loop.

6. The receiver circuitry defined in claim 1, wherein the second data rate is at least two times the first data rate.

7. An integrated circuit that receives a data stream, comprising:
    equalization circuitry that equalizes the data stream,
    the equalization circuitry comprising a multi-stage equalization circuit that equalizes the data stream to produce a first equalized output and further comprising a single-stage equalization circuit that equalizes the data stream to produce a second equalized output, wherein the multi-stage equalization circuit and the single-stage equalization circuit are separate circuits, wherein the multi-stage equalization circuit is a continuous time linear equalization (CTLE) circuit, and wherein the single-stage equalization circuit is another CTLE circuit; and amplifying circuitry that receives the first and second equalized outputs from the equalization circuitry and that amplifies a selected one of the first and second equalized outputs.

8. The integrated circuit defined in claim 7, wherein the amplifying circuitry comprises adjustable gain amplifying circuitry.

9. The integrated circuit defined in claim 7, wherein the multi-stage and single-stage equalization circuits comprise differential circuits.

10. The integrated circuit defined in claim 7, wherein the amplifying circuitry selectively amplifies the selected one of the first and second equalized outputs based on the data rate of the data stream.

11. A method of operating an integrated circuit comprising:
receiving data from an off-chip device;
determining a data rate of the received data;
using a first equalization path that includes a multi-stage equalization circuit to equalize the received data exhibiting a first data rate;
using a second equalization path that includes a single-stage equalization circuit to equalize the received data exhibiting a second data rate, wherein the second data rate is greater than the first data rate, and wherein the second equalization path is separate from the first equalization path; and
using multiplexing circuitry to output an equalized output by selectively routing the equalized data from one of the first and second equalization paths.

12. The method defined in claim 11, further comprising:
with amplifier circuitry, amplifying the equalized output from the first equalization path when the first data rate is less than a threshold and amplifying the equalized output from the second equalization path when the second data rate is greater than the threshold.

13. The method defined in claim 12, further comprising:
when the data rate of the received data is the first data rate, performing a continuous time linear equalization (CTLE) operation using the multi-stage equalization circuit; and
when the data rate of the received data is the second data rate that is greater than the first data rate, performing the CTLE operation using the single-stage equalization circuit.

14. The method defined in claim 12, wherein the amplifier circuitry exhibits a gain, the method further comprising:
with a biasing circuit in the amplifier circuitry, adjusting a voltage that is supplied to the amplifier circuitry to control the gain of the amplifier circuitry.

15. The method defined in claim 11, wherein the multiplexing circuitry selectively enables one of the first and second equalization paths based on a plurality of configuration random access memory (CRAM) bits.

16. The method defined in claim 12 further comprising:
with an operational amplifier, providing a negative feedback signal to the amplifier circuitry.

* * * * *